UNITED STATES PATENT OFFICE.

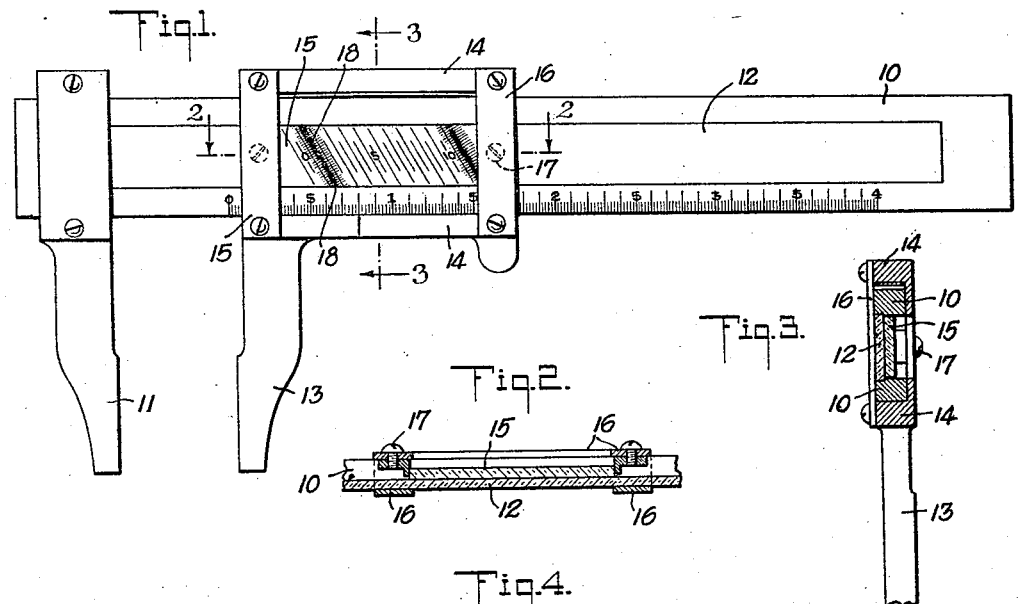
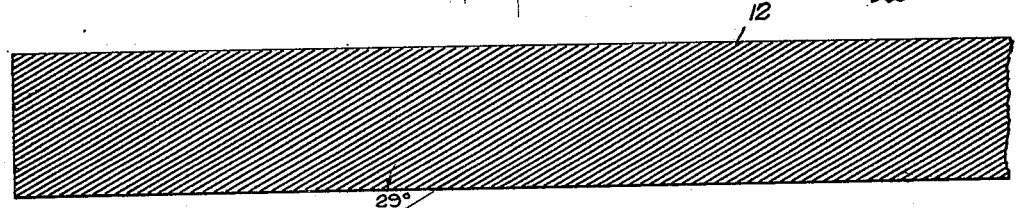
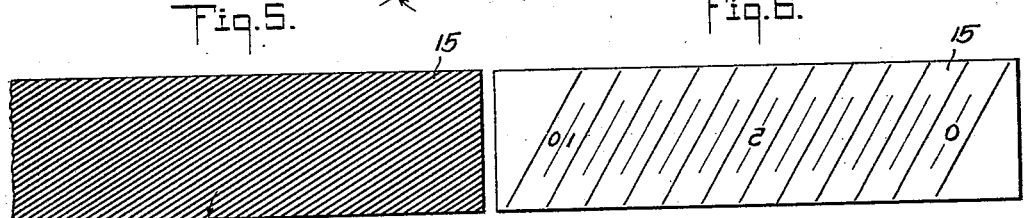
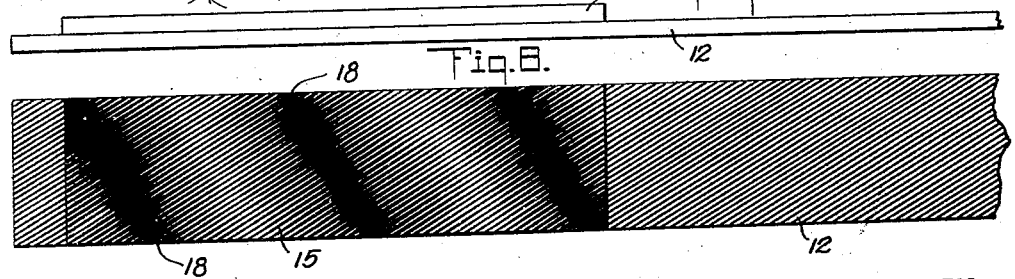
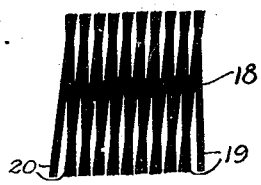

GIOVANNI EUSEBIO GIAMBIASI, OF PHILADELPHIA, PENNSYLVANIA, ASSIGNOR TO HOWARD S. LEVY AND LIONEL F. LEVY, BOTH OF PHILADELPHIA, PENNSYLVANIA.

PRECISION INSTRUMENT.

1,415,627. Specification of Letters Patent. Patented May 9, 1922.

Application filed November 7, 1919. Serial No. 336,458.

*To all whom it may concern:*

Be it known that I, GIOVANNI E. GIAMBIASI, a subject of the King of Italy, and a resident of Philadelphia, in the county of Philadelphia and State of Pennsylvania, have invented a new and Improved Precision Instrument, of which the following is a full, clear, and exact description.

This invention relates to measuring instruments, and more particularly to precision instruments and tools of mensuration for accurately determining infinitely small linear measurements. Further, the invention relates to a new and novel development in the way of line shadows where a moving shadow line spot or wide line is employed to indicate the linear measurements.

A purpose is to disclose a new principle in precision instrument manufacture which will make it possible to discard the conventional screw so universally used in all mensuration instruments, and employ a new principle to more adequately and accurately carry out the functions of measurement devices.

A simple production of an optical phenomena is made use of in the instrument of this invention, and this optical phenomena is used to supplant the screw. The unique manifestation of a visual phenomena is developed through a simple combination of transparent plates with opaque lines etched or drawn thereon. This visual or optical phenomena reduced to its simplest interpretation may be known as a travelling or moving shadow, an opaque medium or visual impression, and simpler still, the phenomena may be known as a line created or inducted across a plane of observation, the line being opaque in character and the surface transparent, or technically viewing the subject, the converse is true to the effect that the line may be transparent and the surface opaque.

Suffice it to say that a geometric line, shadow, or opaque medium, is employed to supplant the screw of old measuring instruments and that the shadow has indeterminate life and functions without wear while a screw wears and loses in value, however small, with every measurement executed by the screw instrument. The superior advantage and value of this measuring instrument over the older ones is at once apparent in view of the life factor of the two instruments. A coefficient of friction is always characteristic of movement of one part on another, and hence the factor of wear, while there is no coefficient of friction, hence no wear, in the rapid advance of light or shadows across an observed plane.

It is this visual phenomena, namely the advance of a shadow across an observed plane, that is made use of in this invention to obtain the desideratum, and the shadow line is controlled to function in determining linear measurements of bodies placed between the receptacle jaws of measuring instruments such as calipers, micrometers, and the like.

To briefly outline the structure of a measuring instrument built in accordance with this invention, it may be said that the instrument comprises a transparent frame, and a transparent slide movably retained on the frame. Both the slide and the frame are provided with lines alternately transparent and opaque, and the lines of each part are drawn at an angle different in value to the lines of the other part. This causes the lines to intersect, and at the intersection there is generated what may be called a band, a shadow, or an opaque medium across the transparent frame, and this medium or line is greatly magnified over the first lines mentioned. This shadow line has the phenomenal facility to travel at a rapid rate when the slide is slowly moved along the frame, and the rate of travel is many times greater than the rate of travel of the slide. This striking phenomenal feature is employed to obtain a magnification of the distance traveled by the slide. For example, the slide may move only one ten-thousandth of an inch while the visual shadow travels the discernible distance of say about one-half, to one or two inches, dependent upon the angular relation of the lines drawn on the two transparent parts.

A further and more detailed description of the instrument and its use will now be given after which a discussion of the relation and function of parts will be presented, and followed, finally, by a delineation of the origin and cause of the phenomenal creation and rapid travel of the shadow line.

Reference is had to the accompanying drawings forming a part of my disclosure wherein one practical example of instrument construction appears. In the drawings:—

Figure 1 illustrates a precision caliper shown in elevation employing the shadow line visual impression to indicate measurements. Figure 2 portrays a sectional view taken on the longitudinal plane of section 2—2 of Figure 1, and Figure 3 likewise illustrates a sectional view taken transversely of the frame on the line 3—3.

Figure 4 portrays a diagrammatic showing of a lined transparent member removed from the instrument frame, and Figure 5 likewise illustrates a diagrammatical showing of the lined transparent member removed from a slide. The Figure 6 shows the reverse side of Figure 5, and this view illustrates a scale ranging from "0" to "5" and "10" employing parallel lines which are etched or formed on the scaled transparent slide.

Figure 7 illustrates an edge view of the lined member of the frame and the lined member of the slide applied face to face one upon the other; while Figure 8 is an illustration of Figure 7 viewing the other surface of Figure 7, or showing the plan area of the slide and frame members applied one to the other. Figure 8 is a diagrammatical illustration showing magnified intersecting lines which function to create a shadow or wide line at the point of intersection of the lines of the two relatively movable transparent members. This view is included to facilitate the comprehension of the development and formation of the shadow line.

Figure 9 includes a set of intersecting lines having relative angles somewhat dissimilar to the other views, and presented with more greatly magnified lines in order to facilitate the understanding of the invention.

A caliper frame is pointed out at 10 and is provided with the usual form of caliper jaw 11. The frame 10 and caliper jaw are constructed of any suitable metal and may be integral one with the other. For the purpose of facilitating the manufacture, the jaw 11 may be separately constructed and subsequently joined with the frame 10. The frame 10 is provided with an elongated opening, and in fact is formed of two parallel members 10 joined together at each end, the frame being a bar channelled out as shown. A scale is made on the frame 10 and graduated in units of measure such as inches or centimeters, and is used in conjunction with a precision scale, later described, to facilitate large measurements.

A transparent member 12 is inlaid in the frame by inserting it in the elongated opening. The transparent member 12 extends approximately the length of the frame. This member may be constructed of glass, celluloid, or any suitable transparent material. Preferably some suitable form of non-fragile glass is used. The transparent member 12 in the frame is lined or etched with fine lines as shown in Figure 4. The member 12 shown in Figure 4 is transparent and the plurality of lines applied thereto represents lines of infinitesimally small dimensions. The lines are ranged angularly acros the plane surface of the transparent member 12 and are parallel. Each line should approximate in breadth the space between each adjacent line in order that the line and the spaces left between the lines shall be equal in width, that is to say, the breadth of the transparent line and the breadth of the opaque line is equal. After the lines are etched in the transparent member 12 of the frame they are rendered opaque by rubbing the plane surface of the etched member with some suitable material. The opaque material embeds in the groove ploughed by the etching tool and renders the ploughed line opaque. In this manner alternate opaque lines and transparent lines are made in the transparent member 12 so that the said member has about an equal number of transparent and opaque lines ranging parallel one with the other. The Figure 4 is rather an elargement of the transparent member 12 of the frame, and is also rather diagrammatical in its showing.

A slide frame 14 is movably confined on the frame 10, and has an index or reference mark which coincides with the "0" of the frame 10 when the jaws are closed. A jaw 13 is carried on the slide frame 14 and is manufactured as a part thereof or built separately and subsequently attached to the slide, according to the best practice of constructing instruments. The slide frame comprises the parallel members 14 confined in sliding engagement with the frame 10, and held together by the cross pieces 16 on both sides of the frame 10. A lined transparent member 15 is fixed to the slide frame parts 16 by a screw 17 or other suitable means. The transparent member 15 is arranged very close to the transparent member 12 and in fact may slide in engagement therewith. The cross sectional view Figure 3 shows the transparent member 12 fitted stationarily in place within the frame 10, and the transparent member 15 of the slide is movably confined in the opening of the frame adjacent to the member 12. The transparent member, therefore, travels back and forth in the channel adjacent the transparent member 12.

The slide 15 is made with a plurality of parallel lines similar to the design and make-up of the member 12. The transparent slide 15 is shown in Figures 5 and 6. The Figure 5 shows one surface of the slide etched with exceedingly close and narrow spaced lines in order to provide said slide with a plurality of parallel opaque lines in between the same number of parallel transparent lines, the opaque lines and the transparent lines having the same width dimension. The development of this lined slide 15 is identical with the development of the lined transparent member 12, the only difference being that the lines of the two members are unequal in angular value. Figure 4 discloses the lines scaled off on a twenty-nine degree angle with the horizontal, while Figure 5 shows the lines of the slide scaled off on a thirty degree angle from the horizontal. The selection of the angles twenty-nine and thirty degrees is arbitrary and used only for the purpose of disclosing the features of this invention. Any dissimilar angle between the lines of the slide and the lines of the frame may be selected. It is preferable to select angles of close value, that is to say, angles varying even to the small extent of a few minutes or a few seconds would in fact produce satisfactory results in an instrument of this type, yet it is preferable to provide a difference in angular value of say about one-half degree or one whole degree. The Figure 6 shows the back side of Figure 5. Figures 5 and 6 show, in fact, a piece of transparent material such as glass. In order to avert confusion which would exist if both sides of the slide 15 were shown at once in one view, there are presented two views, namely Figures 5 and 6. The Figure 5 shows the plurality of parallel transparent and opaque lines on one side thereof, omitting the lines shown in Figure 6; and, conversely, the Figure 6 illustrates the particular arrangement of lines to produce a mensuration scale, and to avoid the confusion which would exist if both surfaces of the slide 15 were shown at once in this view Figure 6, the plurality of lines shown in Figure 5 is omitted from the member 15 in Figure 6. It is seen, therefore, that the two views Figures 5 and 6 are presented to disclose one part where the part is treated as an opaque piece of material, yet it is in fact transparent.

When the two transparent lined members 12 and 15 are applied one to the other, such as is shown in Figures 1 and 8, there is developed a visual phenomena resulting in the casting of a number of shadows across the plane of observation on an angle to a medial line drawn parallel with the longitudinal axis of the frame. This optical or visual phenomena is portrayed both in Figures 1 and 8. The Figure 1 presents the actual instrument for shop and factory use while the Figure 8 merely shows all frame parts removed to leave the bare pair of contacting lined transparent members.

In both of the views the shadow line is cast across the plane of observation due to the intersection of the lines of the slide 15 and stationary member 12. Figure 9 should be observed to facilitate the comprehension of the development of the shadow line 18. The set of vertical lines 19 is taken to be formed on one transparent member while the set of angular lines 20 is taken to be formed on the other transparent member which produces a shadow, or in fact a broad opaque line 18. An examination of the phenomena produced by the intersecting lines will disclose the fact that the shadow is caused by the opaque lines of one member covering up the transparent lines of the other member. At the point of intersection of the angular lines the opaque line lies over the transparent line, and since the opaque line is of the same width dimension as the transparent line, it follows that the transparency ceases to exist due to the introduction of the opaque line thereupon. This adjustment of the opaque lines over the transparent lines functions to cast a shadow line of considerable and quite adequately visible width disposed at an angle across the transparent members 12 and 15 of the instrument. When relative motion occurs between the two transparent members the shadows are made to travel very rapidly across the plane of observation. The lines travel very rapidly as compared to the motion impressed against the slide, that is to say, relative motion between the transparent members develops a high magnification in the movement of the shadows across the plane of observation. It is this magnification of motion of the shadow which results in a visual phenomena useful in the construction of measuring instruments. A comparison of the formation and development of the shadow line 18 and its highly multiplied rate of travel will enable one to understand the operation and use of the instrument disclosed in Figure 1, as will now be further elucidated.

In the use of the instrument, the slide 14 will be opened to receive the body to be measured between the caliper jaws 11 and 13. If the body to be measured has considerable volume, that is to say, is something near one-half inch or approaching one inch in measurement, the slide 14 with its index mark may be adjusted to read one-half inch or one inch on the scale of the frame, and the movement of the shadow line 18 along the plane of observation, or the shadow line's movement between the transparent members will be observed for making the more precise determinations. The shadow line 18 normally coincides with the zero mark on the scale 15 shown in Figure 6 when the caliper jaws are closed or when the caliper jaws have a setting of unit length. When the shadow line 18 travels from one space to another space on the scale shown in Figure 6, there is measured off a linear distance of one-thousandth of an inch between the jaws. Likewise, when the shadow line 18 travels from the zero setting of the scale, Figure 6, to "5" of the scale there is measured off a distance of five-thousandths of an inch between the caliper jaws, and it follows that when the shadow line 18 travels all the way across the scale of Figure 6 from "0" to "10" there is measured off a linear distance of ten one-thousandths of an inch, or one-hundredth of an inch.

The scale made on the back side of the slide 15 as shown in Figure 6 has line spacings dependent on the velocity of travel of the shadow line along the transparent frame 12, and the velocity of travel of the shadow line is dependent on the angular disposition of the lined transparent parts 12 and 15. A mathematical calculation is necessary to determine the distance apart of the lines making the scale shown in Figure 6, and likewise a mathematical calculation is necessary to determine the angular relation between the two lined transparent members in order that the rate of travel of the shadow line will have a value equal to the indications shown on the scale of Figure 6, and furthermore in order that the rate of travel of the shadow line 18 will have a value equal to the linear distance which the jaw 13 moves from the jaw 11.

The instrument may therefore be used for measuring bodies interposed between the jaws thereof by measuring the number of spaces over which the shadow line moves from "0" toward the end of the scale, namely the index "10" at the end thereof. As the scale 15 is moved along the frame 12 the shadow lines 18 will be continuously formed between the contacting faces of the two transparent members. When the left hand shadow line 18 shown in Figure 1 has moved into position coincident with the position of the adjacent shadow line, there is another shadow line created coincident with the original position of the first named shadow line to take its place, and so on to infinitum if the slide could in fact be moved that far. As the slide 15 is moved along the frame 12 there is a continuous formation of parallel shadow lines 18 flashed across the plane of observation of the slide. In taking measurements, the number of shadow lines 18 which come into view may be counted as they originate at the left hand end of the scale and disappear at the right hand end thereof for the purpose of keeping tab on the number of one-tenth inches scaled off.

It is also pointed out that the transparent or white line may be used for effecting measurements or dimensions on the instrument to the same good and effect as the shadow line is employed.

Obviously there are other uses to which this invention and discovery may be put, as, for example, it might be used for advertising purposes by creating optical illusions, and for other purposes, such as rapidly shutting off the light rays to produce a vibrating or pulsating wave of light for any purpose whatsoever.

This instrument is of value and utility in shop and factory use and in all kinds of refined instrument manufacture where exceedingly minute measurements are taken. It is devoid of all adjustable screw parts which wear and change in value, and is dependent only on the original correctness of its manufacture in that the lines of intersection be accurately made to perform the functions as described. The invention is presented to fulfill a long felt need for a dependable measuring instrument of precision.

Having thus described my invention, what I claim as new and desire to secure by Letters Patent is:

A measuring instrument, comprising a pair of translucent members having adjacent flat faces and being movable one over the other along parallel axes, the adjacent flat faces of each of said members being provided with a series of parallel lines, the lines on both members being inclined in the same direction at an angle to their axes but the lines on one member being inclined at a different angle from the lines on the other member to form alternate dark and light parallel bands extending at an opposite angle to said lines, whereby when one of said members is moved axially of the other the intersecting points of the lines on the two members will traverse said members across the adjacent faces thereof so that said parallel dark bands will move axially of said members at a rate of speed equal to the axial distance one member is moved relatively to the other member to cause the intersection to travel the entire length of said lines.

GIOVANNI EUSEBIO GIAMBIASI.